(12) United States Patent
Ebnet et al.

(10) Patent No.: US 12,521,665 B2
(45) Date of Patent: Jan. 13, 2026

(54) FILTER ELEMENT, INTERIOR AIR FILTER AND PRODUCTION METHOD

(71) Applicant: MANN+HUMMEL GmbH, Ludwigsburg (DE)

(72) Inventors: Daniel Ebnet, Marklkofen (DE); Markus Stempfhuber, Altdorf (DE); Matthias Krohlow, Herrenberg (DE); Daniel Schmid, Sachsenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 584 days.

(21) Appl. No.: 17/588,639

(22) Filed: Jan. 31, 2022

(65) Prior Publication Data
US 2022/0152544 A1    May 19, 2022

Related U.S. Application Data

(63) Continuation of application No. PCT/EP2020/071472, filed on Jul. 30, 2020.

(30) Foreign Application Priority Data

Jul. 31, 2019   (DE) .................. 10 2019 120 646.4

(51) Int. Cl.
*B01D 46/52* (2006.01)
*B01D 46/00* (2022.01)

(52) U.S. Cl.
CPC ....... *B01D 46/521* (2013.01); *B01D 46/0001* (2013.01); *B01D 46/0005* (2013.01); *B01D 2271/027* (2013.01)

(58) Field of Classification Search
CPC ............. B01D 46/521; B01D 46/0001; B01D 46/0005; B01D 2271/027; B01D 46/0002;
(Continued)

(56) References Cited

U.S. PATENT DOCUMENTS 5,902,361 A    5/1999  Pomplun et al.
6,110,250 A *  8/2000  Jung ................. B01D 39/163
                                                   55/528

(Continued)

FOREIGN PATENT DOCUMENTS

DE    4327368 A1    2/1995
DE    29906831 U1   9/2000
(Continued)

OTHER PUBLICATIONS

Office Action in corresponding Chinese Appln. No. 202080055188.3, Dec. 31, 2024, 16 pages, China.

*Primary Examiner* — Jennifer Dieterle
*Assistant Examiner* — Qianping He

(57) ABSTRACT

A filter element is provided with a pleated structure of a filter material folded in a zigzag shape. A frame element is attached to the pleated structure and at least partially circumferentially extends around the pleated structure. The frame element is air-permeable and laterally projects away from the pleated structure. A frame device is attached to the frame element. The frame device is an injection-molded plastic part injection molded onto the frame element. In a method for producing the filter element, an air permeable frame element is attached to the pleated structure of a filter material folded in a zigzag shape so as to circumferentially extend at least partially around the pleated structure and project laterally. The frame device is injection molded onto the frame element in an injection molding process. A filter assembly is provided with a filter housing and the filter element is received in the filter housing.

20 Claims, 3 Drawing Sheets

(58) Field of Classification Search
CPC .......... B01D 2271/025; B01D 2271/02; B01D 2265/028; B01D 46/0004; B01D 46/0036; B01D 46/12; B60H 2003/065; B60H 2001/00635; F02M 35/02416; F02M 35/02491; B29C 45/14418
USPC ........................................................ 55/497
See application file for complete search history.

(56) References Cited

U.S. PATENT DOCUMENTS

| | | | |
|---|---|---|---|
| 6,312,489 B1* | 11/2001 | Ernst | B65H 45/20 |
| | | | 55/482 |
| 6,375,699 B1 | 4/2002 | Beck | |
| 7,540,897 B2 | 6/2009 | Stahl et al. | |
| 7,837,755 B2 | 11/2010 | Walz | |
| 2008/0283476 A1* | 11/2008 | Dralle | B01D 35/147 |
| | | | 210/417 |
| 2015/0165352 A1* | 6/2015 | Lang | B01D 29/21 |
| | | | 210/490 |

FOREIGN PATENT DOCUMENTS

| | | |
|---|---|---|
| DE | 102014004738 A1 | 10/2015 |
| DE | 102016002570 A1 | 9/2017 |
| DE | 102016217459 A1 | 3/2018 |
| DE | 102019102172 A1 | 9/2019 |
| EP | 1616736 A1 | 1/2006 |
| JP | 2003290615 A | 10/2003 |
| WO | 18050367 A1 | 3/2018 |
| WO | WO-2018050367 A1 * | 3/2018 ............. B01D 46/00 |

* cited by examiner

FILTER ELEMENT, INTERIOR AIR FILTER AND PRODUCTION METHOD

CROSS-REFERENCE TO RELATED APPLICATIONS

This application is a continuation application of international application No. PCT/EP2020/071472 having an international filing date of 30 Jul. 2020 and designating the United States, the international application claiming a priority date of 31 Jul. 2019 based on prior filed German patent application No. 10 2019 120 646.4, the entire contents of the aforesaid international application and the aforesaid German patent application being incorporated herein by reference.

BACKGROUND OF THE INVENTION

The present invention concerns a filter element. Further, the invention concerns an interior air filter with such a filter element. Still further, the invention concerns a filter assembly.

Even though applicable to any filter elements and filter assemblies, the present invention as well as its underlying problems will be described in the following for an interior air filter of a motor vehicle.

The increasing air pollution, in particular in large cities, in connection with the use of modern air conditioning devices makes it necessary to purify by means of suitable filters the air that is introduced from the exterior into the interior of a motor vehicle and processed or air-conditioned. For this purpose, for example, particle filters, odor filters or their combination with each other are conceivable that filter out or adsorb as much as possible suspended substances, particles, and odors contained in the ambient air.

For filtering air for the interior of a motor vehicle, often folded or pleated filter materials, for example, filter nonwovens, are used that form a pleated structure. For this purpose, an initially flat filter material sheet is folded in a zigzag shape. The pleated structure is held, for example, by lateral straps and head bands or another frame. Such filter elements can be fixed in an exchangeable manner in a filter receptacle. The thus formed filter assembly can be installed in an air conditioning device of a corresponding motor vehicle.

WO 2018/050367 discloses a filter element in which a plastic frame is provided around a pleated structure with a laterally projecting web. A circumferentially extending seal is formed integrally on the web. DE 10 2016 217 459 A1 discloses a filter element where a frame, fastened by form fit, is formed on the pleated structure and its fold profiles and fold edges.

Moreover, DE 10 2019 102 172 A1 discloses a filter element that comprises a folded bellows to which a circumferentially extending air-impermeable plastic frame is molded. The plastic frame has a circumferentially extending radial projection on which a seal is arranged.

SUMMARY OF THE INVENTION

In view of this background, the present invention has the object to provide an improved filter element.

Accordingly, a filter element with a pleated structure of filter material folded in a zigzag shape and a laterally projecting, air-permeable frame element attached to the pleated structure and at least partially circumferentially extending around the pleated structure is therefore proposed. A frame device is attached to the frame element. In this context, the frame device is configured as an injection-molded part that is molded onto the laterally projecting frame element.

In contrast to known filter elements with injection-molded frame devices, in the filter element according to the invention the circumferentially extending frame element, onto which the frame device is molded, is formed of an air-permeable material. Therefore, one could refer to the filter element according to the invention as hybrid filter element which combines the technologies of a filter element that is molded around with plastic material as well as a filter element with conventional frame element construction, in particular in the form of head bands and lateral bands of nonwoven, as is conventional in the field of the automotive interior air filters. This has the advantage that production costs can be lowered because the required injection molding tools are constructed less complex and, in addition, provides the possibility of providing more folds and/or more closely arranged folds. This is in particular advantageous in embodiments in which a HEPA filter medium which, in general is comparatively thin, is to be used in the pleated structure.

Moreover, a method for producing a filter element is proposed in which, to a pleated structure of filter material folded in a zigzag shape, a frame element is attached that at least partially circumferentially extends around the pleated structure and projects laterally. Moreover, a frame device is molded onto the laterally projecting frame element in an injection molding process.

The proposed filter element, in which, by means of an injection molding process or an injection molding method, a frame device is molded onto laterally projecting frame elements, can be easily produced and requires, aside from the pleated structure as a basic component, only minimal further structural elements such as the frame elements.

In addition, an interior air filter with such a filter element is proposed.

In embodiments of the filter element, the frame element comprises a section that laterally projects past a width and/or height of the pleated structure. The height of the pleated structure results from the height of the folds of which the zigzag-shape folded filter material is formed. The width of the pleated structure extends in general along the respective fold edges.

The frame element can also be a projecting section of a lateral band that is attached to the fold profile of the pleated structure. It is also conceivable that the frame element is a section, projecting laterally past a length and/or height of the pleated structure, of a head band that is attached to an end fold section of the pleated structure. The length of the pleated structure is provided in general along the machine direction or transverse to the fold edges of the pleated structure.

In embodiments, the frame element is a section of an end fold section that projects laterally past a length and/or height of the pleated structure.

In this respect, it is possible to produce the frame element in particular of the same material as the filter material. The filtration properties of lateral bands or head bands must not mandatorily have the same filtration properties as the filter material.

In embodiments, the lateral band and/or the head band has an L profile wherein the shorter section or leg corresponds to the respective projecting section. Due to the projecting section, the frame device can be integrally formed with little expenditure on the pleated structure that is positioned in the interior of the respective frame.

In embodiments, the projecting section and/or the frame device projects laterally past a height of the pleated structure away from the pleated structure. In this context, the frame element can project laterally at a slant and past the height of the pleated structure. In this way, an injection molding of the frame device onto the frame element is facilitated.

In embodiments, the frame device is fastened to the frame element exclusively by being molded around. Preferably, the frame device is configured so as not to be directly molded onto the fold edges and/or fold profiles of the pleated structure. In this way, the filter surface is optimized because the material of the frame device does not cover the filter material. In this respect, the frame device is preferably not connected to or in contact with the zigzag-shape folded filter material in embodiments.

Moreover, in preferred embodiments, the frame element can comprise a nonwoven material or be comprised thereof, wherein the nonwoven material is in particular a spunbond nonwoven that comprises preferably at least proportions of synthetic fibers.

The nonwoven material of the frame element can have an air permeability at 200 Pa between 200 and 3,500 $l/m^2s$, preferably between 400 and 1,800 $l/m^2s$. Alternatively or additionally, the nonwoven material of the frame element can comprise a thickness between 1 and 6 mm and/or a weight per surface area between 100 and 500 $g/m^2$, preferably between 230 and 290 $g/m^2$.

In a variant of the production method, the frame element is clamped in an injection molding tool at a separation contour of the injection molding tool in such a way that during the injection molding process no material of the frame device can reach directly fold edges and/or fold profiles of the pleated structure.

In embodiments, the frame element is embodied along a length side and/or width side of the pleated structure in a strip shape, band shape and/or flat. The frame element can be produced, for example, like the lateral band or head band, of a nonwoven material.

In embodiments, the frame device surrounds the pleated structure in the manner of a frame and is configured for radial sealing along a flow direction through the pleated structure. The pleated structure can be embodied, for example, in a cuboid shape, wherein the flow direction in general is envisioned transverse to a machine direction and transverse to an orientation of the fold edges.

In embodiments, the frame element has a strip-shaped region, free of injection-molded material of the frame device, in a transition region to a lateral band section, a head band section, and/or an end fold section corresponding to the height of the pleated structure.

In this respect, it can be ensured that no material of the frame device reaches directly the filter material or the pleated structure. The corresponding strip-shaped region in the transition region can be achieved during production by clamping between two parts along the separation contour of the injection molding tool.

Moreover, a filter assembly with a filter housing and a filter element, as described above or in the following, is proposed. The filter element can be received at least partially in the filter housing and the frame device is clamped by a housing separation line axially along a flow direction. In particular by the lateral projection of the frame device, an axial sealing action can be achieved easily by a suitable sealing geometry of the frame device.

The filter element comprises, for example, a filter material and one or a plurality of stabilizing elements, in particular in the manner of lateral bands and/or head bands (also referred to as end face bands) which stabilize the filter material at least in sections in order to maintain its shape, in particular in filtering operation. The stabilization elements, in particular the lateral bands and head bands, can form in this context a closed or open frame—even monolithic—which surrounds the filter material. Preferably, the filter element comprises for the pleated structure two head bands and two lateral bands that are connected, in particular material-fused, to the pleated structure and surround the latter frame-shaped as frame elements. The lateral bands and head bands are formed, for example, of filter fabric, laid filter material or filter nonwoven.

The filter material can be embodied folded or corrugated. As folds, for example, zigzag folds or W folds are known. The filter material can be embossed and subsequently folded sharp-edged at embossment edges with formation of fold edges. A flat material filter sheet can serve as starting material which is then formed correspondingly. The filter material is, for example, a filter fabric, a laid filter material or a filter nonwoven. In particular, the filter medium can be produced in a spunbonding method or meltblowing method. Moreover, the filter medium can be felted or needled. The filter material can comprise natural fibers, such as cotton, or plastic fibers, for example, polyester, polyphenyl sulfide or polytetrafluoroethylene. The fibers can be oriented during processing in, at a slant and/or transverse to the machine direction.

The filter material can be a single-layer or multi-layer configuration. It can comprise moreover an adsorption means, for example, active carbon. Moreover, the filter material can comprise an antimicrobial and/or anti-allergenic effect. As antimicrobial substance, for example, zinc pyrithione or nano silver, as anti-allergenic substance, for example, polyphenol is conceivable.

A corresponding filter element serves for filtering fluids, i.e., gaseous and/or liquid media, for example, air. A gaseous medium or air encompasses here also gas-solid mixtures or air-solid mixtures and/or gas-liquid mixtures or air-liquid mixtures. For example, an air conditioning device can comprise the filter element.

An in particular open filter material can be designed to remove particles of the test dust A4 according to ISO 12103-1 from an air flow with a filtration rate of 0.10 to 0.30 m/s, in relation to the filter medium surface, at an air permeability of greater than 3,000 $l/m^2s$ (determined according to ISO 9237 at 200 Pa). The determination of the filtration parameters can be realized, for example, according to DIN 71460-1.

A particularly high-filtering filter material can be designed to remove particles of the test dust A2 according to ISO 12103-1 as well as NaCl aerosol particles according to DIN 71460-1 from an air flow with a filtration rate of 0.10 to 0.30 m/s, in relation to the filter medium surface, at an air permeability of greater than 350 $l/m^2s$ (determined according to ISO 9237 at 200 Pa). The determination of the filtration parameters can be realized, for example, according to DIN 71460-1.

In embodiments, the filter material is produced as a synthetic medium with multi-layer construction. A grammage of the filter material amounts preferably to 50-150 $g/m^2$. The filter material corresponds preferably to an efficiency class of E10-H14 according to DIN EN 1822-3 in the version at the filing date of this application.

In variants, the fold spacing amounts to less than 5 mm. Conceivable is an embodiment of the filter element as a HEPA filter. A material thickness of the filter material is, for example, between 0.2 mm and 1 mm.

In embodiments, the frame device is formed of a frame material that comprises a thermoplastic elastomer material. Conceivable is in particular an elastomer according to ISO 18064 in the version at the filing date of this application, such as rubber materials, TPE, PUR, foamed polymers and other seal materials that appear suitable.

The frame device can comprise a seal which seals a raw side correlated with the filter element in relation to a clean side thereof. The seal can be the same component as the frame device produced in an injection molding method. As an alternative, the seal can be designed as an additional component. Thus, the seal can be attached, for example, to the frame material. Conceivable is also a two-component embodiment of the frame device. A hard inner frame region provides then the transition to the frame element and a softer outer region serves as the seal.

Moreover, a filter element is proposed which is produced according to the aforementioned method.

The filter element can be used in passenger cars, trucks, construction machines, watercraft, rail vehicles, aircraft as well as in general in air conditioning technology, in particular in heating/air conditioning devices, in domestic appliances, in fuel cells or in the building technology. These motor vehicles or vehicles can operated electrically and/or by means of fuel (in particular gasoline or diesel). In regard to the building technology, in particular stationary devices for the treatment of air are conceivable.

Still further, the invention concerns a vehicle with such a filter assembly.

The features described for the filter element apply correspondingly to the interior air filter, the filter assembly as well as the vehicle, and vice versa.

Further possible implementations of the invention comprise also combinations, not explicitly mentioned, of features or method steps described above or in the following in relation to the embodiments. In this context, a person of skill in the art will also add individual aspects as improvements or supplements to the respective basic form of the invention.

Further configurations or embodiments of the invention are subject matter of the dependent claims as well as of the embodiments of the invention described in the following. In the following, the invention will be explained in more detail with the aid of embodiments with reference to the attached Figures.

PREFERRED EMBODIMENTS

Figure 1:
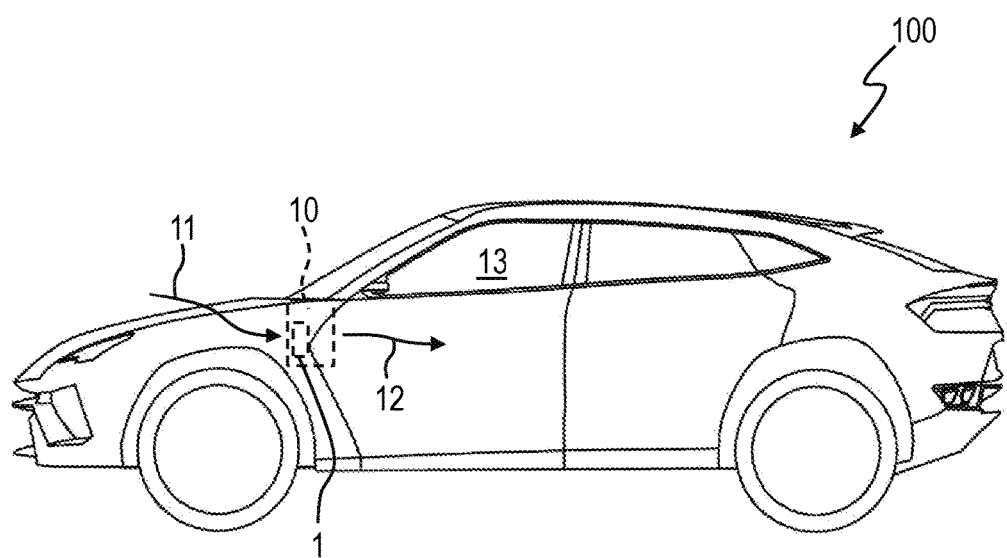
FIG. 1 shows a schematic illustration of a general motor vehicle with an interior air filter.

FIG. 1 shows a motor vehicle 100 with an air conditioning device that comprises a filter assembly 10. For example, the air conditioning device can be designed as a heating/air conditioning device. The air conditioning device or the filter assembly 10 takes in ambient air 11 and supplies filtered air 12 to a cabin 13 (also referred to as passenger compartment) of the motor vehicle 100. Filtration is realized by a filter element 1 which is formed as an interior air filter.

Figure 2:
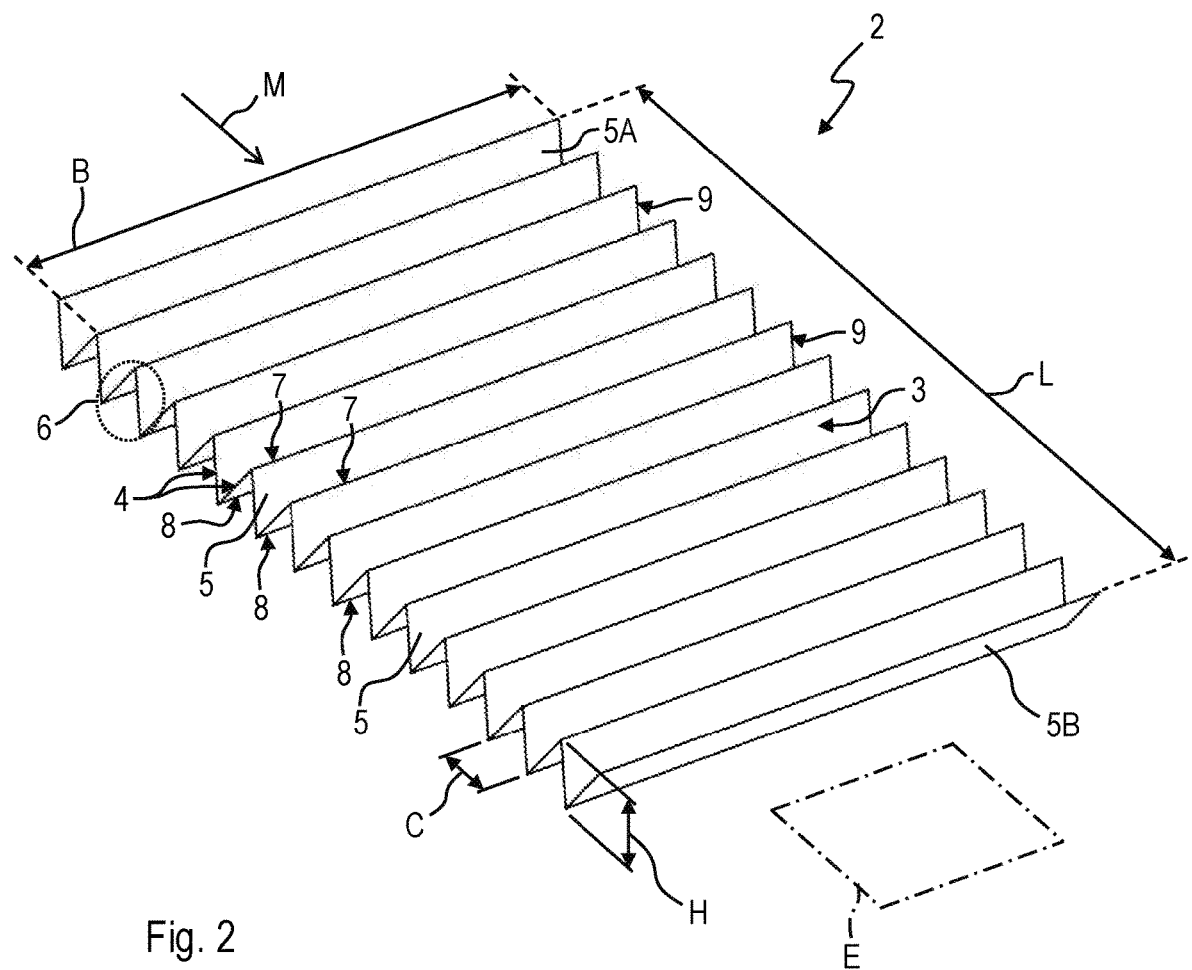
FIG. 2 shows a perspective illustration of a filter material.

FIG. 2 shows a folded filter material 3 in isolation and can be referred to in the illustrated form as a pleated structure 2. The filter material 3 is, for example, a filter nonwoven, filter fabric, laid filter material or filter felt, in particular a needled felt. In particular, the filter material 3 can be produced by a meltblown method. The filter material 3 can comprise natural fibers, such as cotton, or plastic fibers, for example, of polyester, polyphenyl sulfide or polytetrafluoroethylene. The fibers can be oriented during processing in, at a slant to and/or transverse to the machine direction M. Also, the fibers can be stretched in a spatial direction. The filter material 3 can be of a single-layer or multi-layer configuration.

For forming the pleated structure 2, the filter material 3 comprises folds 6 which extend typically transverse to the machine direction M. The folded filter material 3 is also referred to as pleating. The folds 6 can be generated by means of folding along sharp fold edges 7, 8 (also referred to as fold tips) or by a corrugated embodiment of the filter material 3. One can see in FIG. 2 upper fold edges 7 and, in the orientation of FIG. 2, bottom-side fold edges 8. A respective fold 6 can be defined by two neighboring fold sections 5 which are connected to each other by a corresponding fold edge 8. The fold structure is designed as a zigzag fold structure. Thus, a zigzag-shaped fold profile 4, 9 is realized at the sides of the pleated structure 2.

Also, a fold structure in which the folds 6 comprise a variable height H is possible. Moreover, the fold distance C between the folds 6 or the neighboring fold edges 7, 8 of identical fold orientation can vary. The filter material 2 can be designed to be self-supporting, i.e., the folds 6 are shape-stable upon intended flow during filtering operation.

The filter material 3 is delimited in machine direction M by end fold sections 5A, 5B. Transverse thereto, the filter material 3 is delimited by lateral end face fold edges (also referred to a fold profiles 4, 9). "End face fold edge" refers to the lateral edge of the filter material 3 at the side of the pleated structure 2 which extends between neighboring fold edges 7, 8 of a respective fold 6.

The filter material 3 can comprise a rectangular shape in the plan view, i.e., in the plane E of its flat extension. However, a triangular, pentagonal or polygonal, round or oval shape is conceivable also.

In the illustration of FIG. 2, a length L of the pleated structure 2 along the machine direction M and transverse to the fold edges 7, 8 is indicated. Along the fold edges 7, 8 and transverse to the machine direction M, a width B of the pleated structure 2 is usually indicated.

Figure 3:
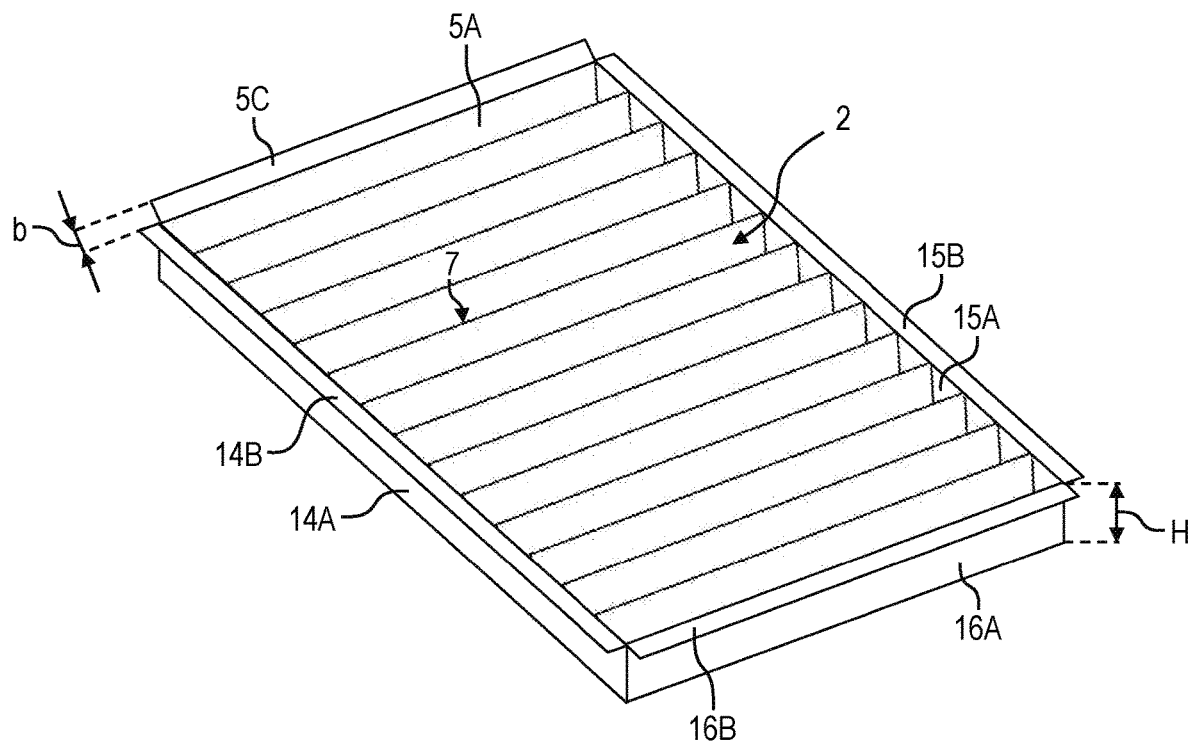
FIG. 3 shows a schematic view of a pleated structure according to an embodiment.

For producing a filter element, for example, an interior air filter element, a circumferentially extending frame element is attached to the pleated structure 2 illustrated in FIG. 2. In FIG. 3, the pleated structure 2 illustrated in FIG. 2 is indicated with top-side fold edges 7. Lateral bands 14, 15 are applied to the fold profiles 4, 9. The lateral bands 14, 15 have each an L profile with a section or leg 14A, 15A that is, for example, glued to the fold profiles 4, 9, and a laterally projecting section or leg 14B, 15B. The laterally projecting lateral band sections or legs 14B, 15B are part of a frame element. The legs 14A, 15A extending vertically in the orientation of FIG. 2 correspond to the height H of the pleated structure 2.

At the head side, oriented in the orientation of FIG. 3 forwardly to the right, the pleated structure 2 is closed off by a head band 16. The head band 16 comprises in turn a section or leg 16A corresponding to the height H of the pleated structure 2 and a laterally projecting section or leg 16B. At the head section of the pleated structure 2 opposite the head band 16 and indicated at the top to the left in the orientation of FIG. 3, the end fold section 5A has a projecting leg 5C which is projecting past the height H and the length L of the pleated structure 2. The leg 5C is separated from the end fold section 5A by a fold edge.

The sections 5C, 14B, 15B, 16B which are projecting respectively past the height H have a width b which makes it possible that a fixed connection to the injection molded material can be realized in a subsequent injection molding process. In this respect, FIG. 3 shows a pleated structure 2 at which a frame element laterally projecting from the pleated structure 2 is formed. The frame element is here formed by the four projecting sections 5C, 14B, 15B, and 16B.

Figure 4:
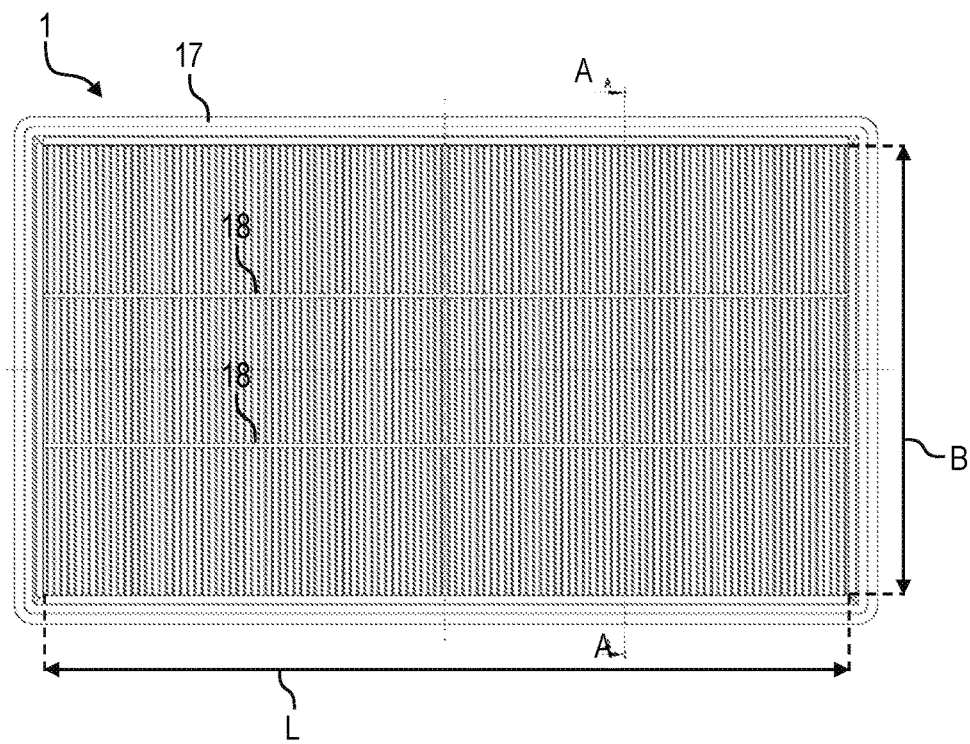
FIG. 4 shows a schematic view of a filter element according to an embodiment in a plan view.

At the projecting sections 5C, 14B, 15B, 16B, as illustrated in FIG. 4, a frame device 17 is formed. In FIG. 4 showing a plan view of the embodied filter element 1, the frame device 17 is wider in its lateral extension than the width B of the pleated structure 2 and longer than the length L of the pleated structure 2. In the illustration of FIG. 4, the projecting sections 5C, 14B, 15B, 16B inside the frame device 17 are molded around or embedded by the material of the frame device 17.

The filter element 1 in the embodiment of FIG. 4 shows moreover two adhesive traces 18 that, for example, are formed of a hot melt material and applied parallel to the length of the filter element 1 on the upper fold edges and the intermediately positioned fold sections. The adhesive traces 18 stabilize the fold spacings and penetrate, for example, into the folds.

Figure 5:
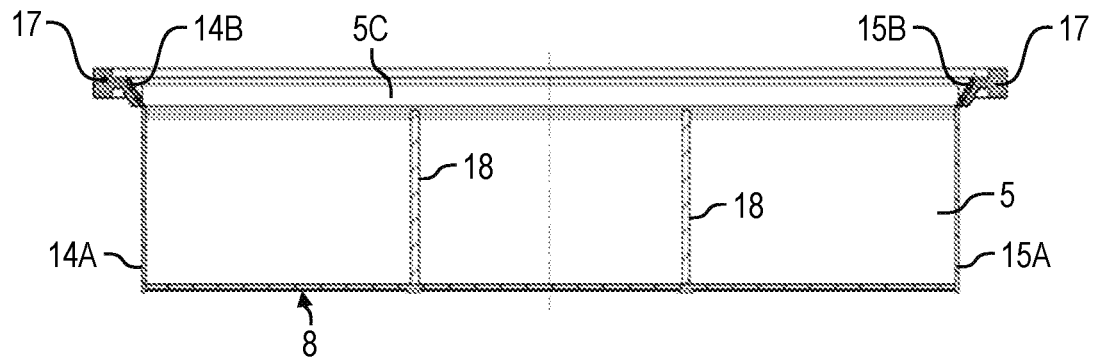
FIG. 5 shows a cross section A-A of FIG. 4.
Figure 6:
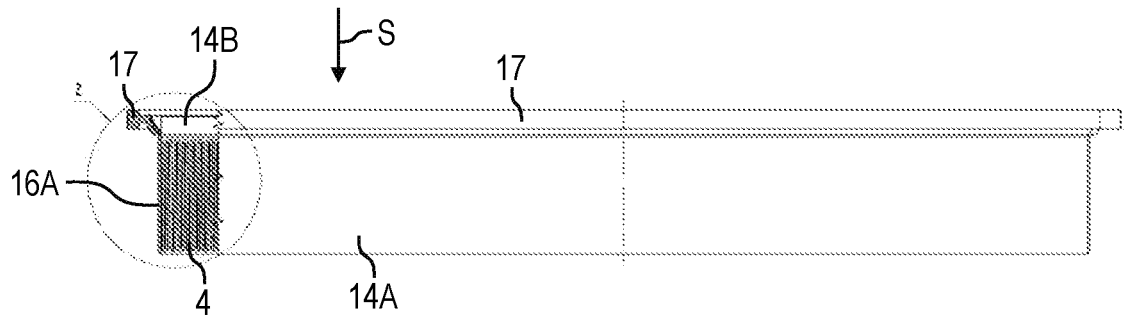
FIG. 6 shows a side view with a rim-side cut-away section of FIG. 4.
Figure 7:
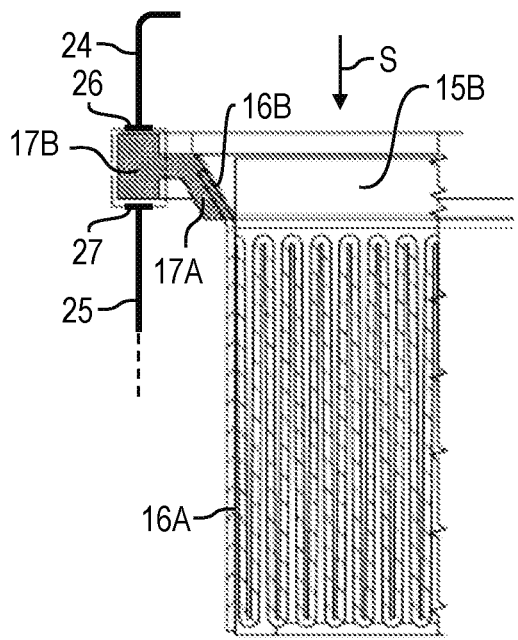
FIG. 7 shows an enlarged detail Z of FIG. 6.

In FIGS. 5, 6, and 7, further illustrations of the filter element 1 are represented. FIG. 5 shows a cross section view A-A. One can see in FIG. 5 the lateral band sections 14A, 15A and their projecting sections 14B, 15B. The projecting sections 14B, 15B acting as frame elements are oriented in the orientation of FIG. 5 at a slant upwardly and laterally away from the pleated structure 2. To the left and to the right in FIG. 5, one can see the cross section profile of the frame device 17 wherein the frame elements or the projecting sections 14B, 15B are enclosed. Moreover, at the center, the adhesive traces 18, for example, of hot melt, are illustrated and the lower fold edges 8.

FIG. 6 shows a view of the filter element 1 transverse to the cross section direction A-A viewing the lateral band 14. To the left, a cut-away section Z is indicated that exposes the fold profiles 4. Moreover, a head band 16A can be seen at the left side. FIG. 7 shows an enlarged detail of the cut-away section Z of FIG. 6. One can see that the frame device 17 is injection molded onto the section 16B in an injection molding process. In the orientation of FIG. 7, the frame device 17 comprises in this context a left axial seal section 17B and a fastening section 17A in which the projecting section 16B or the part 16B of the frame element is embedded. The projecting sections which are not illustrated are fastened analogously to the frame device 17 along the length of the filter element.

The frame device 17 contacts in this context neither the fold edges nor material sections of the filter element 1 below the height H of the folds. The configuration of the frame or of the frame device 17 prevents that filter surface is lost due to material of the frame 17 molded around during injection molding. The flow direction S through the filter element is realized from the top to the bottom in the orientation of FIGS. 5, 6, and 7.

In a filter assembly, the filter element 1 is received in a housing. FIG. 7 shows a part of the housing with a top housing section 24 and a bottom housing section 25. Between these two sections 24, 25, there is a separation line or separation contour of the housing 24, 25. In the installed state of the filter element 1, the seal section 17B of the frame device 17 is engaged or axially clamped at the separation contour 26, 27 of the housing. In this way, a safe sealing action between the raw fluid region and the clean fluid region of the resulting filter assembly 1 is ensured.

Figure 8:
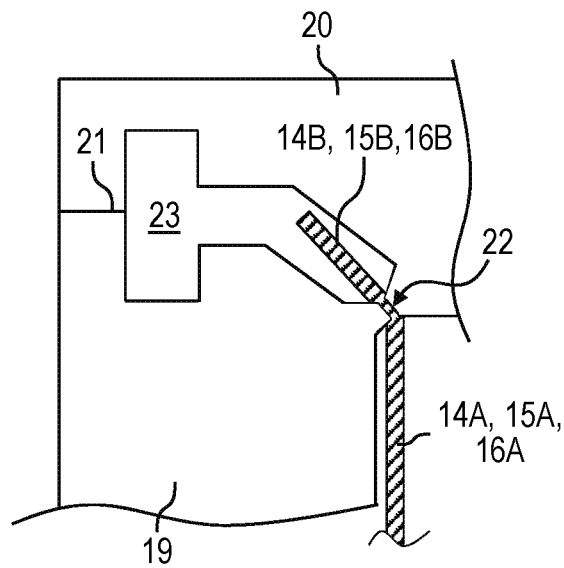
FIG. 8 shows a detail of a schematic view of an injection mold for producing a filter element of FIGS. 4-7.

In a production process of the filter element 1, the frame device 17 is produced in particular by use of an injection mold in an injection molding process. FIG. 8 show shows now a detail of a schematic view of an injection mold or of an injection molding tool 19, 20 for producing a filter element 1 as it has been described before. For ease of illustration, only the section 14B, 15B or 16B projecting away from the pleated structure is indicated to the right in FIG. 8 inside of a cavity 23 of the injection molding tool 19, 20. One can see moreover a portion of the sections 14A, 15A or 16A corresponding to the height of the pleated structure, arranged vertical in the orientation of FIG. 8.

In a transition region between the vertical section 14A, 15A, 16A of the lateral band or head band and the respective projecting section 14B, 15B or 16B, the material of the lateral band or head band is clamped by the two tool parts 19, 20. This is realized along a separation contour 22 of the injection molding tool. A further separation contour 21 is indicated in FIG. 8 to the left adjacent to the cavity 23.

The injection molding tool or the tool bottom part 19 and the tool top part 20 are pressed against each other along the separation contours 21, 22 with clamping of the projecting section 14B, 15B, 16B. Subsequently, injection of the plastic material forming the frame device 17 is realized. After hardening of the injection molding material, by avoiding a contamination of the pleated structure with this material, the frame device 17 inclusive a suitable seal contour (compare FIG. 7) is produced.

For improved seal properties in radial but also in axial direction, a two-component injection molding method can be employed also. As a whole, the proposed production process provides for a simple production of filter elements, in particular for the use in the field of interior air filters.

LIST OF REFERENCE CHARACTERS 1 filter element/interior air filter
2 pleated structure
3 filter material
4 fold profile
5 fold section
5A, 5B end fold section
5C frame element
6 fold
7, 8 fold edge
9 fold profile
10 filter device
11 raw air
12 filtered air
13 cabin
14 (14A, 14B) lateral band
15 (15A, 15B) lateral band
14B, 15B frame element
16 (16A, 16B) head band 17 frame device
17A fastening section
17B seal section
18 adhesive trace
19, 20 injection molding tool
21, 22 tool separation
23 cavity
24, 25 housing parts
26, 27 separation contour of housing
100 vehicle
b projecting length
B width
C fold distance
E plane
H height
L length
M machine direction
S flow direction

What is claimed is:

1. A filter element comprising:
a filter material;
an air-permeable frame element attached to the filter material and at least partially circumferentially extending around the filter material, the frame element comprising a lateral band attached to the filter material and a projecting section of the lateral band that projects laterally away from the filter material, and the frame element comprising a head band attached to the filter material and a projecting section of the head band that projects laterally away from the filter material, and the filter material comprising an end fold section comprising a projecting section of the end fold section that forms a part of the frame element; and
a frame device attached to the frame element, wherein the frame device is molded onto the frame element;
wherein the projecting section of the lateral band of the frame element projects laterally away from the filter material at a slant past both a width of the filter material and a height of the filter material, and/or wherein the projecting section of the head band of the frame element projects laterally away from the filter material at a slant past both a length of the filter material and the height of the filter material, and wherein the projecting section of the end fold section projects laterally past the length and the height of the filter material away from the filter material.

2. The filter element according to claim 1, wherein the lateral band of the frame element comprises a leg that is attached to a lateral edge of the filter material, and wherein the frame element is free of the frame device in a transition region between the projecting section of the lateral band and the leg of the lateral band.

3. The filter element according to claim 1, wherein the head band of the frame element comprises a leg that is attached to an end edge of the filter material, and wherein the frame element is free of the frame device in a transition region between the projecting section of the head band and the leg of the head band.

4. The filter element according to claim 1, wherein at least a portion of the frame device projects laterally away from the filter material past the height of the filter material.

5. The filter element according to claim 1, wherein the frame device is attached by injection molding to the frame element.

6. The filter element according to claim 5, wherein the frame device is not injection molded onto fold edges of the filter material and/or onto fold profiles of the filter material.

7. The filter element according to claim 1, wherein the air-permeable frame element comprises or is comprised of a nonwoven material.

8. The filter element according to claim 7, wherein the nonwoven material is a spunbond nonwoven and comprises at least a proportions of synthetic fibers.

9. The filter element according to claim 7, wherein the nonwoven material comprises one or more properties selected from the group consisting of an air permeability at 200 Pa between 200 and 3,500 $l/m^2s$; a thickness between 1 and 6 mm; and a weight per surface area between 100 and 500 $g/m^2$.

10. The filter element according to claim 1, wherein the frame element is embodied as a strip or as a band of a flat configuration and extends along the length and/or the width of the filter material.

11. The filter element according to claim 1, wherein the frame device surrounds the filter material and is configured to radially seal along a flow direction through the filter element.

12. A filter assembly comprising:
the filter element according to claim 1; and
a filter housing configured to receive at least partially the filter element;
wherein the frame device of the filter element is clamped at a housing separation line of the filter housing axially along a flow direction of the filter element.

13. The filter element according to claim 1, wherein the head band of the frame element is arranged parallel to the end fold section of the filter material and/or parallel to fold edges of the filter material, and wherein the projecting section of the head band of the frame element is arranged at an angle greater than 90 degrees relative to the end fold section of the filter material and/or relative to the head band of the frame element.

14. A filter element comprising:
a filter material:
an air-permeable frame element attached to the filter material and at least partially circumferentially extending around the filter material, the frame element comprising a lateral band attached to the filter material and a projecting section of the lateral band that projects laterally away from the filter material, and the frame element comprising a head band attached to the filter material and a projecting section of the head band that projects laterally away from the filter material, and the filter material comprising an end fold section comprising a projecting section of the end fold section that forms a part of the frame element; and
a frame device attached to the frame element, wherein the frame device is molded onto the frame element;
wherein the projecting section of the lateral band of the frame element projects laterally away from the filter material at a slant past both a width of the filter material and a height of the filter material, and/or wherein the projecting section of the head band of the frame element projects laterally away from the filter material at a slant past both a length of the filter material and the height of the filter material, and
wherein the end fold section comprises a leg corresponding to the height of the filter material, and wherein the frame element is free of the frame device in a transition region corresponding to the height of the filter material.

15. The filter element according to claim 14, wherein the lateral band of the frame element comprises a leg that is attached to a lateral edge of the filter material, and wherein the frame element is free of the frame device in a transition region between the projecting section of the lateral band and the leg of the lateral band.

16. The filter element according to claim 14, wherein the head band of the frame element comprises a leg that is attached to an end edge of the filter material, and wherein the frame element is free of the frame device in a transition region between the projecting section of the head band and the leg of the head band.

17. The filter element according to claim 14, wherein the projecting section of the end fold section projects laterally past the length and the height of the filter material away from the filter material.

18. A method for producing a filter element, the method comprising:
   attaching an air-permeable frame element to a filter material so as to circumferentially extend at least partially around the filter material, the frame element comprising a lateral band attached to the filter material and a projecting section of the lateral band that projects laterally away from the filter material, and the frame element comprising a head band attached to the filter material and a projecting section of the head band that projects laterally away from the filter material, and the filter material comprising an end fold section comprising a projecting section of the end fold section that forms a part of the frame element; and
   molding a frame device onto the frame element;
   wherein the projecting section of the lateral band of the frame element projects laterally away from the filter material at a slant past both a width of the filter material and a height of the filter material and/or wherein the projecting section of the head band of the frame element projects laterally away from the filter material at a slant past both a length of the filter material and the height of the filter material, and wherein the projecting section of the end fold section projects laterally past the length and the height of the filter material away from the filter material.

19. The method according to claim 18, further comprising clamping the frame element in an injection molding tool along a separation contour of the injection molding tool such that the frame device does not contact fold edges and/or fold profiles of the filter material during an injection molding process.

20. A filter element comprising:
   a filter material:
   an air-permeable frame element attached to the filter material and at least partially circumferentially extending around the filter material, the frame element comprising a lateral band attached to the filter material and a projecting section of the lateral band that projects laterally away from the filter material, and the frame element comprising a head band attached to the filter material and a projecting section of the head band that projects laterally away from the filter material; and
   a frame device attached to the frame element, wherein the frame device is molded onto the frame element;
   wherein the projecting section of the lateral band of the frame element projects laterally away from the filter material at a slant past both a width of the filter material and a height of the filter material, and/or wherein the projecting section of the head band of the frame element projects laterally away from the filter material at a slant past both a length of the filter material and the height of the filter material, and
   wherein the lateral band of the frame element is arranged parallel to fold profiles of the filter material and/or transverse to fold edges of the filter material, and wherein the projecting section of the lateral band of the frame element is arranged at an angle greater than 90 degrees relative to the fold profiles of the filter material and/or relative to the lateral band of the frame element.

\* \* \* \* \*